United States Patent [19]

Jackson

[11] 4,300,332
[45] Nov. 17, 1981

[54] SAFETY CONTROL FOR RIDING LAWN MOWER

[75] Inventor: Harold P. Jackson, McDonough, Ga.

[73] Assignee: McDonough Power Equipment, Division of Fuqua Industries Inc., McDonough, Ga.

[21] Appl. No.: 127,492

[22] Filed: Mar. 5, 1980

[51] Int. Cl.³ .......................................... A01D 69/10
[52] U.S. Cl. .................................... 56/11.3; 56/11.6; 56/DIG. 22
[58] Field of Search ...................... 56/11.3, 11.6, 202; 192/11 VQ

[56] References Cited

U.S. PATENT DOCUMENTS

| | | | |
|---|---|---|---|
| 3,570,637 | 3/1971 | Pitman et al. | 56/11.3 |
| 3,628,315 | 12/1971 | Bartholomew | 56/11.6 |
| 4,058,957 | 11/1977 | Roseberry | 56/11.3 |
| 4,159,613 | 7/1979 | Knudson et al. | 56/11.6 |

Primary Examiner—Robert A. Hafer
Attorney, Agent, or Firm—William E. Mouzavires

[57] ABSTRACT

In a power-driven riding lawn mower, a safety control is provided for automatically disengaging and stopping the cutting blade when the operator leaves the lawn mower or raises his feet while seated on the lawn mower. The control is operated through a foot bar engageable by the operator's feed to permit the cutting blade to rotate during a cutting operation but when the operator raises his feet from the foot bar or dismounts from the mower, the control will activate mechanisms for disengaging the drive and applying a positive brake to the cutting blade. While the control will permit the operator to manually disengage the drive and apply a brake to the cutting blade while the foot bar is depressed by the operator's feet, the control will not permit the operator to reengage the drive while the foot bar is depressed.

11 Claims, 6 Drawing Figures

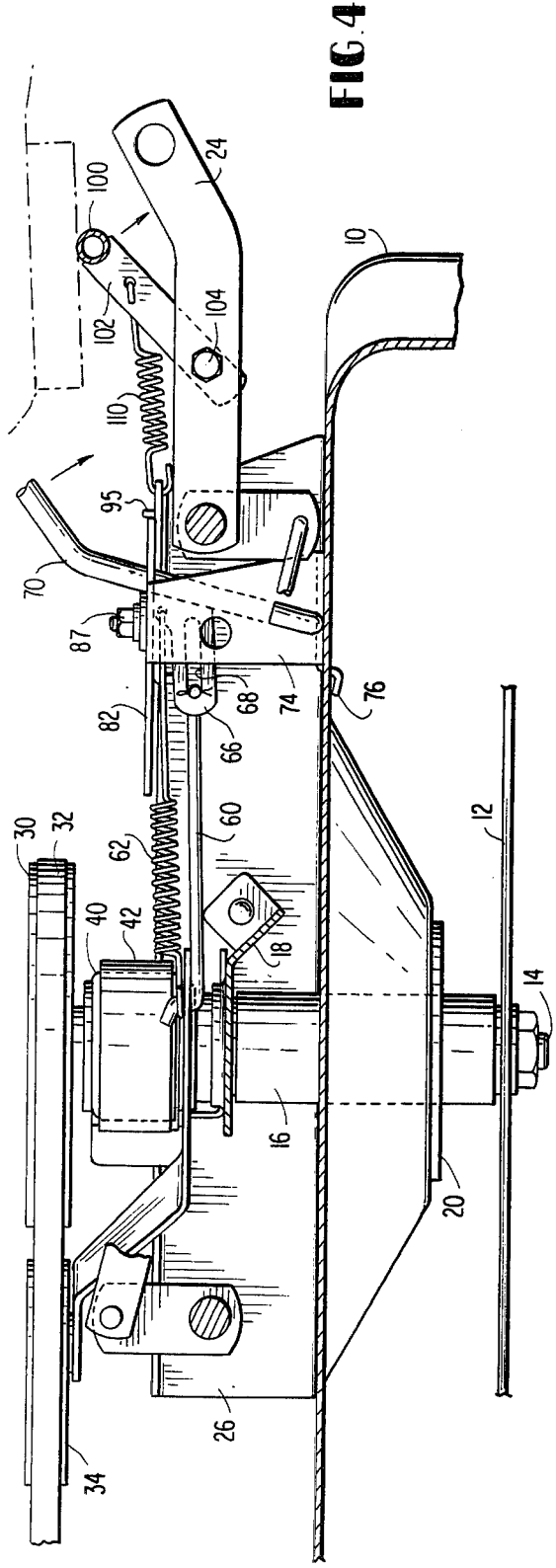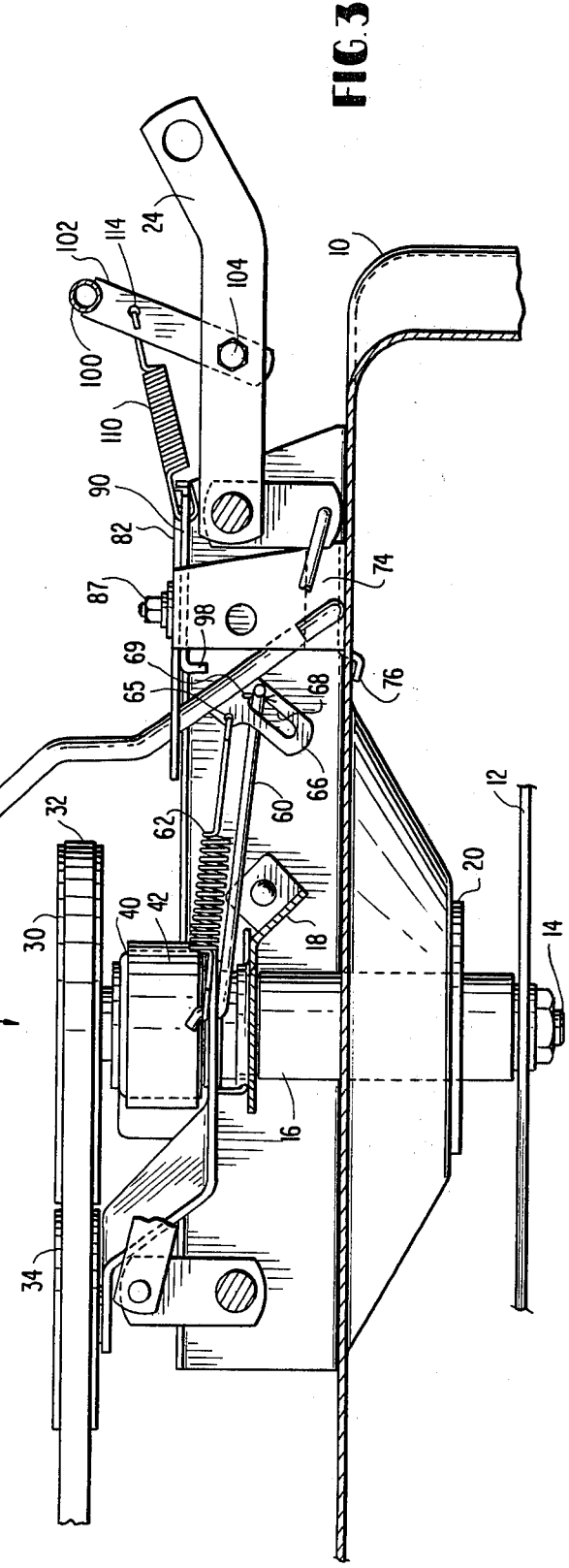

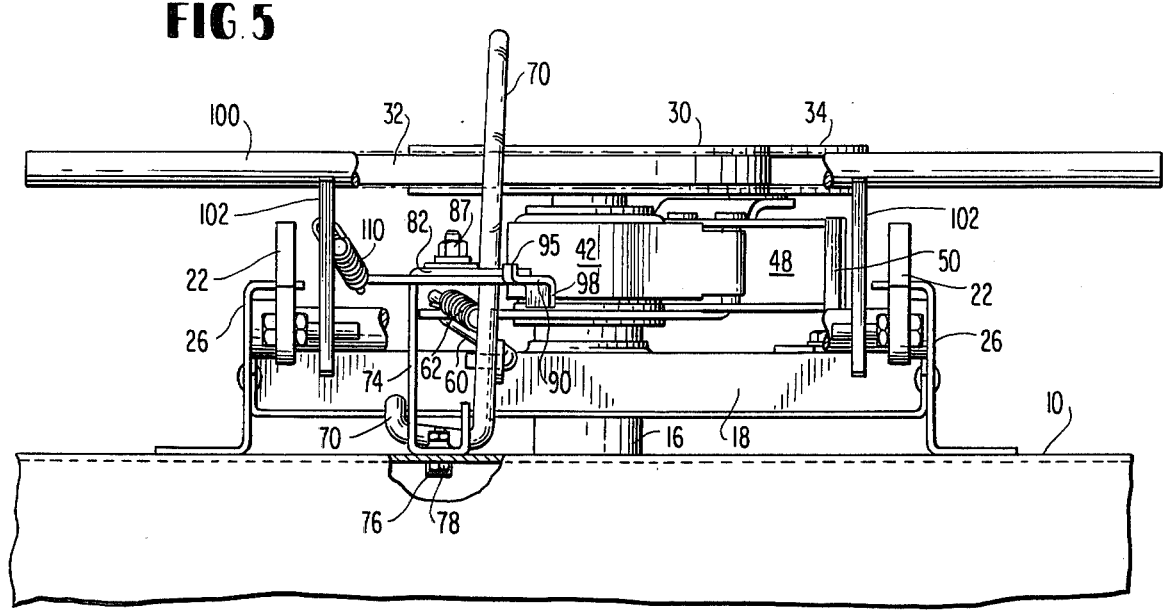
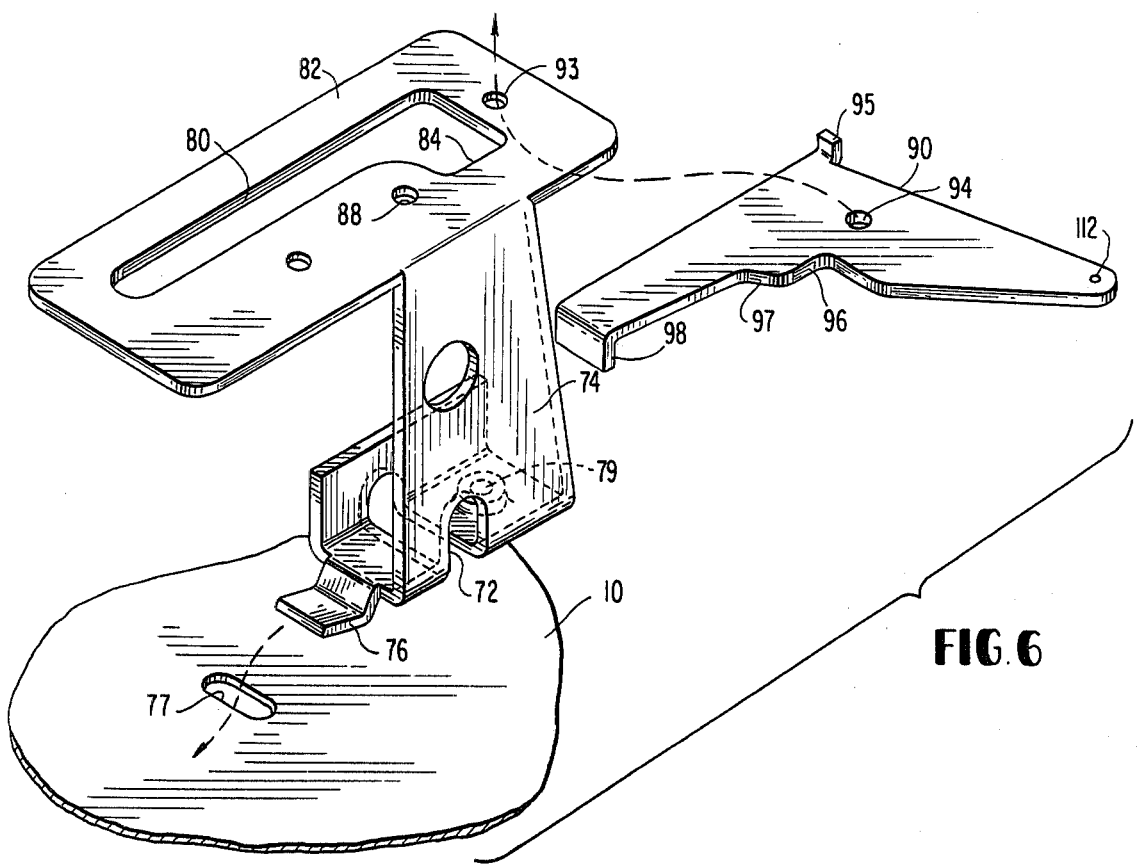

SAFETY CONTROL FOR RIDING LAWN MOWER

BACKGROUND AND OBJECTS OF THE INVENTION

The ever-increasing safety requirements imposed on lawn mowers and similar machines have resulted in attempts to control the cutting blade so as to bring it to a stop automatically when the operator leaves the lawn mower while the cutting blade is engaged in rotation.

It is therefore an object of the present invention to provide a novel control for use in riding, power-driven, lawn mowers which will automatically stop the cutting blade if the operator leaves the machine or raises his feet when the cutting blade is operating in rotation. Included herein is the provision of such a control which, in the condition indicated, will operate to disengage the drive and apply a positive brake, to the cutting blade.

Another object of the present invention is to provide such a control as described above which will not inhibit the operator's normal control of the mower such as, for example, in performing clutching, braking and speed-shifting functions and further, will not otherwise impair the operator's comfort while operating the lawn mower.

A further object of the present invention is to provide such a control as described above which will also reduce if not minimize, inadvertent actuation of the cutting blade.

Yet another object of the present invention is to provide such a control as described above which is difficult to circumvent, relatively simple and yet dependable and durable in operation and which moreover, may be readily adapted to existing power-driven riding mowers on the market.

SUMMARY OF INVENTION

Summarizing the present invention, it may be applied to conventional power-driven riding lawn mowers including a rotatable cutting blade enclosed in a blade housing for rotation in a horizontal plane. The blade is driven through a pulley fixed to a vertical drive shaft (or spindle) of the cutting blade to be rotated by a pulley belt deriving its energy from a suitable engine or motor. An idler pulley is provided to tension the pulley belt to establish a drive to the drive shaft. In addition, a brake mechanism is provided to positively brake the drive shaft or to release the latter to permit rotation of the blade. The idler pulley and brake mechanisms are operated through a control lever which may be grasped by the operator for purposes of engaging or disengaging the idler pulley relative to the pulley belt and for braking or releasing the brake mechanism relative to the cutting blade drive shaft.

In accordance with the present invention, a control is provided to maintain the control lever in position for permitting activation of the cutting blade as long as a foot bar or similar member is depressed by the operator's feet. However, once the operator raises his feet from the foot bar or dismounts from the mower, the control will automatically release the control lever and cause disengagement of the drive and application of the brake to the cutting blade to bring the latter to a stop. While the control mechanism of the invention will permit the operator to manually move the control member for purposes of stopping the blade while the foot bar is depressed, the control mechanism of the present invention will not permit the cutting blade to be activated from a still position as long as the foot bar is depressed. The foot bar is conveniently positioned directly behind the control pedals so that the operator may comfortably depress the foot bar to initiate and maintain operation of the cutting blade while, at the same time, permitting the operator to perform other normal functions such as clutching, braking or shifting speeds.

DRAWINGS

Other objects and advantages of the present invention will become apparent from the following more detailed description taken in conjunction with the attached drawings in which:

FIG. 3 is a side, elevational, view of the mower with the parts in the mode corresponding to that shown in FIG. 1;

FIG. 4 is a side, elevational, view of the mower with the parts in the mode corresponding to that in FIG. 2;

FIG. 5 is an elevational view of the lawn mower as seen from the front end thereof; and FIG. 6 is an exploded, perspective, view of certain parts included in the lawn mower.

DETAILED DESCRIPTION

Figure 1:
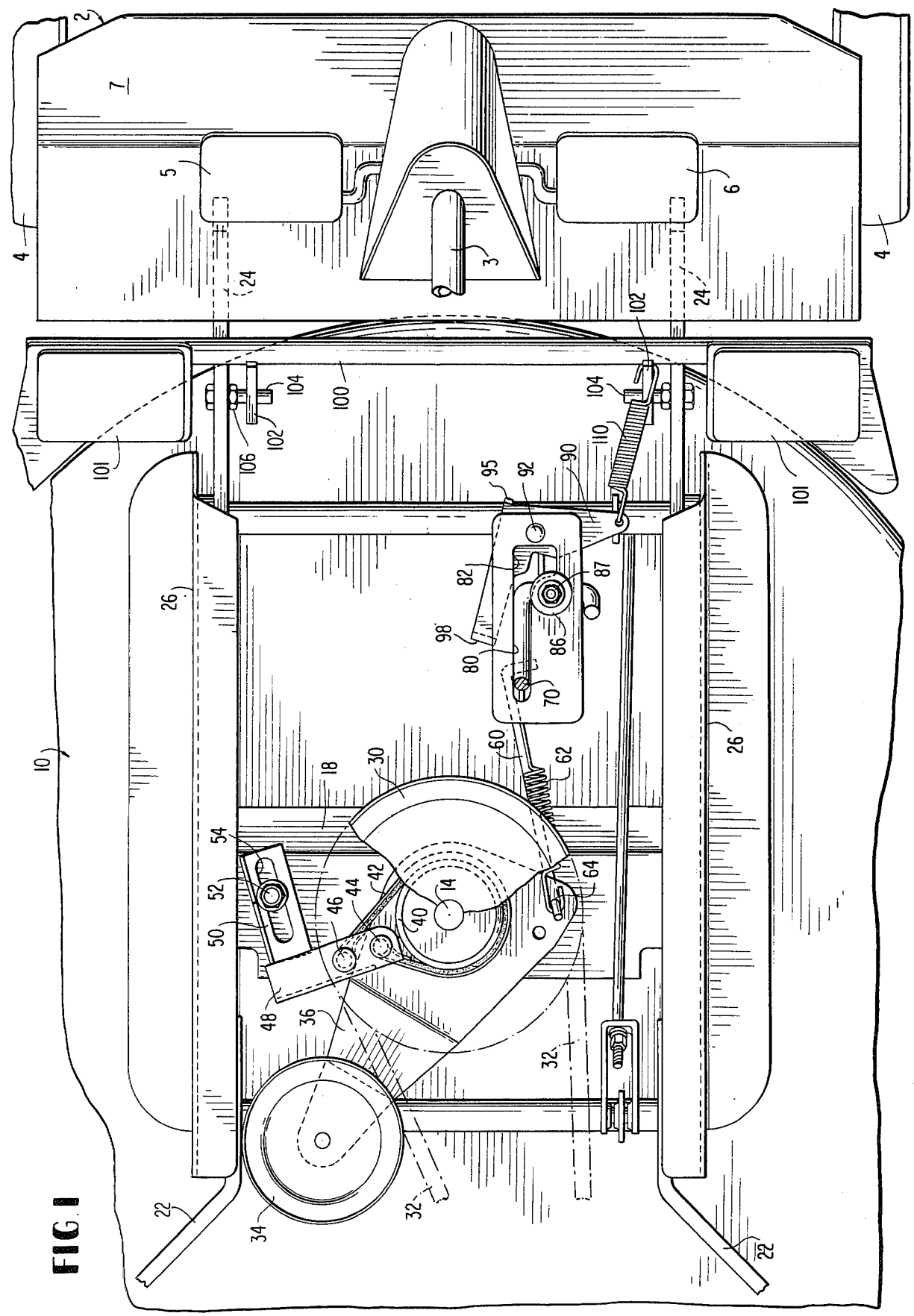
FIG. 1 is a plan view of a front portion of a power-driven riding mower (with parts removed for clarity) incorporating the control of the present invention, with the parts shown in the mode when the cutting blade is deactivated such as when the mower is at rest.

Referring now to the drawings in detail, there is shown for illustrative purposes only, a power-driven riding lawn mower incorporating a control mechanism embodying the present invention. Although only relevant portions of the mower are shown, a complete disclosure of the type of lawn mower to which the present invention is applicable may be gained from U.S. Pat. Nos. 3,154,903; 3,716,977 and 4,158,279 assigned to the assignee of the present application and whose disclosures are incorporated herein by reference as may be necessary. Referring to FIGS. 1 and 3, the mower includes a blade housing 10 enclosing a cutting blade 12 shown mounted for rotation in a horizontal plane by means of a drive shaft or spindle 14 mounted to extend vertically and generally centrally of the housing. Drive shaft 14 is received in a bearing 16 which is mounted to the blade housing 10 through supports 18 and 20. At its front end, blade housing 10 is mounted to a steering unit generally designated 2 through means of arms 24 projecting forwardly from the blade housing. The steering unit includes handle bars (not shown) fixed to a steering column 3, front wheels 4, and brake clutch and auxiliary brake control pedals 5 and 6, and a foot platform 7. At its rear end, blade housing 10 is suspended by means of chains, not shown, from a traction unit (not shown) through rear arms 14. For a complete disclosure of the suspension system just referred to and which in no way forms part of the present invention, reference may be had to U.S. Pat. No. 3,154,903 identified above. Extending in the forward-rearward direction of the blade housing 10 on opposite sides of its horizontal deck are a pair of support rails 26 which are fixed to the blade housing 10 and which are utilized to mount or connect other parts of the mechanisms to be described below; it being understood that the support rails 26 constitute no part of the present invention and are conventional.

Referring to FIGS. 1 and 3, the cutting blade drive shaft 14 is driven through means of a pulley 30 fixed to the drive shaft above the blade housing and receiving a pulley belt 32 which extends in a horizontal plane from pulley 30 rearwardly of the blade housing where it is connected to a suitable engine or motor (not shown) through means of a suitable transmission (not shown). Assuming the associated engine is operating and the pulley belt 32 is moving, in order to establish drive for rotating pulley 30 and cutting blade 12, an idler pulley 34 is utilized for tensioning the pulley belt 32 in a well-known manner. Idler pulley 34 is mounted on an idler pulley mount arm 36 to be movable into engagement with the pulley belt 32 for establishing a drive and to be movable away from pulley belt 32 for disengaging the drive. Idler pulley mount arm 36 is mounted about the drive shaft 14 to be rotatable about the axis of the drive shaft for purposes of engaging or disengaging the idler pulley with respect to pully belt 32 and also for purposes of engaging or releasing a brake now to be described.

The brake includes a brake drum 40 mounted about and fixed relative to the drive shaft 14 and a brake band 42 received about the brake drum 40. One end of the brake band 42 is fixed by means of a pin 46 to what will be termed a "brake band mounting arm" 48 while the other end of the brake band 42 is fixed by means of a pin 44 to the idler pulley mount arm 36. Brake band mount arm 48 abuts against a stop 50 which is fixed relative to the blade housing by means of a bolt 52 received in an elongated slot 54 formed in the stop. Slot 54 allows the position of the stop to be adjusted, and a lock nut is provided about bolt 52 for locking the stop 50 in any desired adjusted position.

In order to establish a drive to the pulley 30 and in turn, to the drive shaft 14 and cutting blade 12, it is neacessary to rotate the idler pulley mount arm 36 in a counterclockwise direction (as viewed in the drawings) in order to tension the pulley belt 32 with idler pulley 34. Rotation of mount arm 36 is achieved by a manually operated control lever 70 and a connection between the latter and the mount arm 36. This connection includes a connecting rod and spring assembly including a connecting rod 60 and a tension spring 62. Rod 60 has one end received in an aperture 64 in the idler pulley mount arm 36 and an opposite end received in an elongated slot 68 formed in an ear 66 projecting rearwardly from control lever 70 as best shown in FIGS. 3 and 4. A cotter pin 69 is used to retain the forward end of connecting rod 60 in its slot 68. Tension spring 62 is secured at its rear end about a hooked end portion of connecting rod 60 and at its forward end in an aperture 65 in ear 66.

Figure 2:
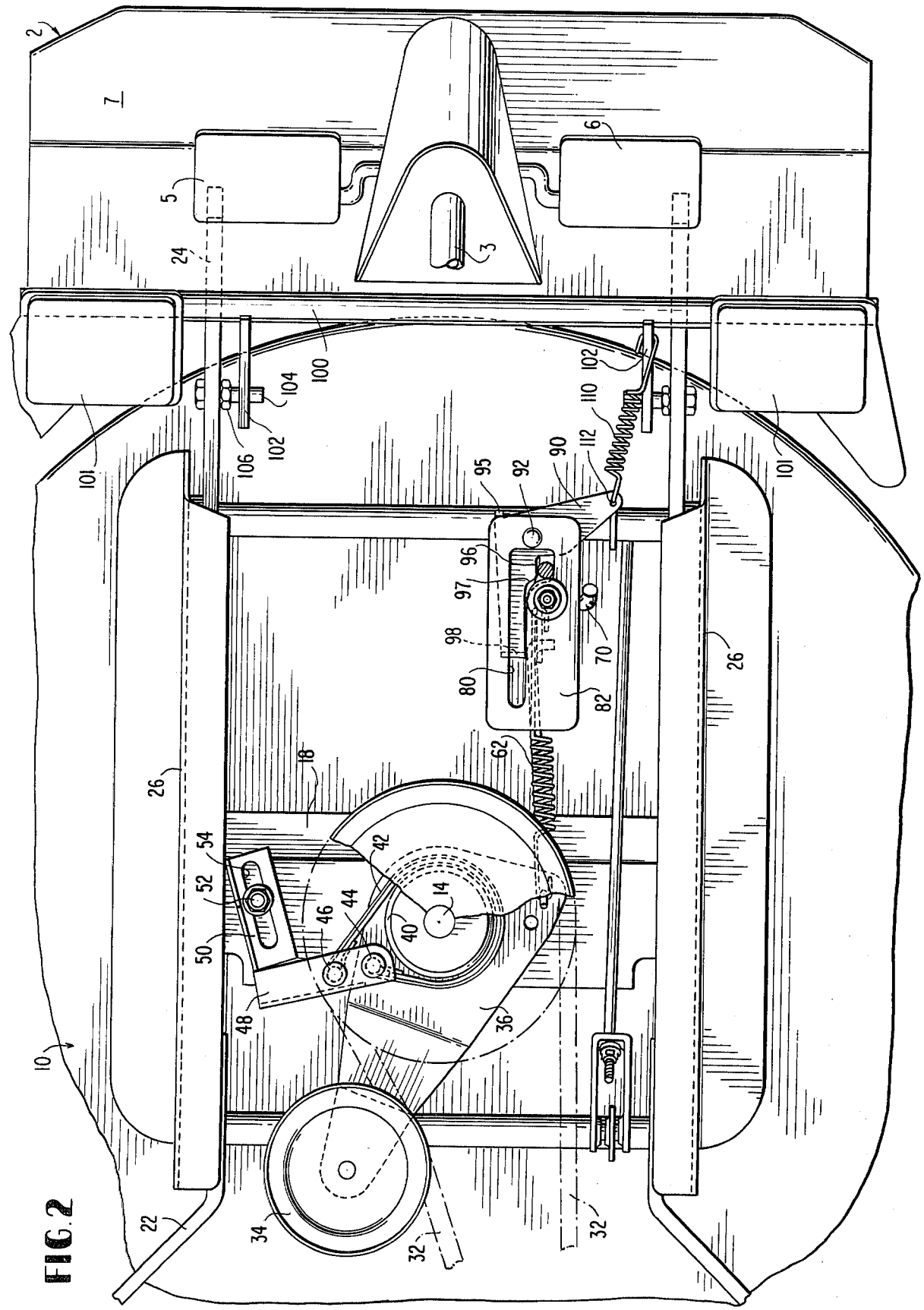
FIG. 2 is a view similar to FIG. 1 except that the parts are shown in the mode during rotation of the cutting blade.

When control lever 70 is moved to its forwardmost position shown in FIGS. 2 and 4, the rod and spring assembly 60, 62 will have rotated idler mount arm 36 counterclockwise to tension pulley belt 32 with the idler pulley 34 as shown in FIG. 2. Also, brake band 42 will have released pressure on brake drum 40 to permit the drive shaft 14 and cutting blade 12 to rotate assuming of course that the engine (not shown) is operating. In the rearwardmost position of control lever 70, as shown in FIGS. 1 and 3, the spring tension on idler mount arm 36 caused by tension spring 62 will have been reduced, thus allowing pulley belt 32 to become relaxed while moving the idler pulley 34 and its associated mount arm 36 in a clockwise direction, the result being to disengage the drive to the cutting blade 12. However, even though the tension spring 62 is in a more relaxed condition when compared to its condition when control lever 70 is in the forwardmost position shown in FIGS. 2 and 4, tension spring 62 when in the position shown in FIGS. 1 and 3 will still exert a certain amount of tension on rod 60 so as to cause the brake band 42 to wind tighter around the brake drum 40 to positively brake the drive shaft 14 and bring the cutting blade 12 to a stop.

Referring to FIGS. 5 and 6, control lever 70 is guided in its movements between its forewardmost position shown in FIG. 2 and its rearwardmost position shown in FIG. 1 by means of an elongated slot 80 formed in a horizontal top plate 82 of a bracket 74. The latter is fixed at its base to the blade housing 10 by means of a tab 76 received in a slot 77, and a bolt 78 extending through blade housing 10 and an aperture 79 in the base of the bracket. Control rod 70 is pivotally mounted for movement in the forward-rearward direction and vice versa of the mower housing by means of a slot 72 formed in the bottom of bracket 74 as shown in FIG. 6 to receive the bottom end of control lever 70 as shown in FIG. 5. Slot 80 in the top plate 82 of bracket 74 includes an elongated portion extending in the forward-rearward direction of the mower and an enlarged portion 84 located at the front end of the slot 80 as best shown in FIG. 6.

The above described apparatus is in accordance with that which exists in the prior art. In addition, such prior art apparatus contains a retaining recess (not shown) in the enlarged portion 84 of the forward end of slot 80 used to maintain the control lever 70 in its forwardmost position wherein the blade is activated. When it is desired to deactivate the blade, the operator using the apparatus of the prior art, would remove the control lever 70 from the recess and place it in alignment with the elongated portion of slot 80 whereupon the tension spring 62 would move the control lever 70 to its rearwardmost position for deactivating the blade.

In accordance with the present invention, the retaining recess of the prior art described above is eliminated, and a control is provided to govern the control lever 70 in response to movement of a foot member mounted on the mower to be engageable by the operator's feet. In carrying out the present invention in its preferred form, a roller in the form of a small disc or washer 86 is rotatably mounted by means of a nut and bolt assembly 87 on the horizontal top plate 82 of bracket 74 so as to present (instead of a retaining recess as was used in the prior art) a desired arcuate edge along which the control lever 70 may move as will be described further below. Roller 86 is mounted at the juncture between the elongated portion and the enlarged portion 84 of slot 80; the bolt 87 mounting roller 86 passing through an aperture 88 as best shown in FIGS. 5 and 6.

In order to retain control rod 70 in the enlarged slot portion 84 on the top plate 82 of bracket 74, a retaining member 90 is utilized which, in the specific embodiment, is pivotally mounted to bracket 74 for movement between a retaining position where it engages and retains control member 70 in the enlarged slot portion 84 as shown in FIG. 2 and a release postion where it permits the control member 70 to leave the enlarged slot portion 84 as best shown in FIG. 1. In the specific embodiment illustrated, the retaining member 90 is in planar form and is pivotally mounted below the top plate 82 in parallel relationship therewith by means of a pivot 92 received in an aperture 94 in the retaining member and an aligned aperture 93 in the top plate 82.

In order to limit movement of the retainer member 90 relative to the bracket 74 in one direction, a stop 95 is provided on the retaining member 90 to engage the top plate 82 of bracket 74 as best shown in FIG. 2 which illustrates the parts with the control lever 70 retained in the enlarged slot portion 84 during which time the blade is operating. In the specific embodiment shown wherein the retaining member 90 has a generally L-shape, it further includes a recess portion 96 whose edge engages one side of control member 70 when the parts are in the mode just described, see FIG. 2.

As indicated above, retaining member 90 operates in response to a foot bar generally 100 which in the preferred embodiment shown, includes an elongated member which may be a rod having foot pedals 101; the rod 100 located transversely across and above the front end of the blade housing 10 in the region where the operator's heels may confortably engage the same while the front of the operator's feet rest on platform 7 of the steering unit 2. Foot bar 100 is mounted for pivotal movement in a vertical plane about a horizontal axis by means of arms 102 fixed to and projecting rearwardly from, the foot bar 100 and which are mounted for pivotal movement relative to the front suspension arms 22 of the blade housing as best shown in FIGS. 1, 2 and 3. Bolts 104 are fixed to suspension arms 122 by means of a lock nut 106 and are received in apertures in arms 102 so that the foot bar 100 will be pivotable about a horizontal axis coinciding with the axis of bolts 104.

Foot bar 100 is connected to retaining member 90 to operate the same and in the specific embodiment shown, this is achieved by a tension spring 110 having one end secured in an aperture 112 at one extremity of the retaining member 90 and having an opposite end secured in an aperture formed in the closest mounting arm 102 of foot bar 100. FIG. 3 shows the foot bar 100 in what may be termed a "normal position", that is, without any pressure being exerted thereon by the operator's feet or otherwise. In this position, tension spring 110 positions the retaining member 90 in the release position shown in FIG. 1, wherein the retaining member opens the enlarged slot portion 84 permitting control member 70 to move to its rearwardmost position disengaging the cutting blade. However, when foot bar 100 is depressed (see FIG. 4), it will tension spring 110 causing retaining member 90 to move in a counterclockwise direction as viewed in FIG. 2 so as to close enlarged slot portion 84 of aperture 80 to retain the control member 70 in the enlarged portion of the slot for allowing operation of the cutting blade.

To summarize operation of the present invention and assuming the operator is seated in the mower with the engine operating and with the operator's feet removed from foot bar 100, the control member 70 will be in its rearwardmost position in slot 80 and the drive to the cutting blade will be disengaged and the brake band 42 applied to positively brake the drive shaft 14 as shown in FIGS. 1 and 3. If the operator wishes to operate the cutting blade, he leaves foot bar 100 in its raised position and grasps control lever 70 and moves it forwardly through the elongated portion of slot 80 and then into the enlarged portion 84. While manually holding the control lever 70 in the aforesaid position, the operator must then depress the foot bar 100 to pivot retaining member 90 for closing the enlarged slot portion 84 to keep the control lever 70 therein. As described above, such positioning of the control lever 70 will cause the pulley belt 30 to be tensioned by the idler pulley 34 to establish drive to the pulley 30, drive shaft 14 and the cutting blade 12. At the same time, the brake band 42 will be released from the drum 40 so that the cutting blade will rotate for a cutting operation. As long as the foot bar 100 remains depressed by the operator, the cutting blade will continue to rotate. However, should the operator raise both feet from the foot bar, such as when the operator leaves the machine or otherwise, tension spring 110 will pivot the foot bar 100 away from the deck to its raised position which, in turn, will pivot retaining member 90 in a clockwise direction as viewed in FIGS. 1 and 2 to open the large slot 84; whereupon the tension force of the other tension spring 62 will force control lever 70 out of the enlarged slot portion 84 and rearwardly through the elongated slot portion, thus causing disengagement of the drive to the cutting blade and application of the positive brake on the drive shaft to stop the cutting blade. In moving out of the enlarged slot portion 84 and into the elongated portion of slot 80, the control member 70 will move about roller 86.

It should be understood that while the cutting blade can be deactivated and brought to a stop by the operator releasing the foot bar as described above, the same results may be achieved while the foot bar 100 remains depressed, by the operator manually moving the control lever 70 out of the enlarged slot portion and rearwardly along the elongated slot portion. In doing this, the control rod 70 under the force of the operator, will pivot retaining member 90 in the clockwise direction as viewed in FIGS. 1 and 2. It should be noted, however, that while the operator can manually move the hand lever 70 out of the enlarged slot portion and into the elongated slot portion while the foot bar is depressed in order to deactivate the cutting blade, the operator cannot perform the reverse operation, that is, move the control lever 70 forwardly into the enlarged slot portion 84, when the foot bar is depressed in order to activate the cutting blade. This is prevented by another recessed edge 97 formed on the inner edge of the retaining member 90 which, when in the position shown in FIG. 2, will be generally aligned with the axis of the pivot 92 so that any forces imposed on the recessed edge portion 97 will pass through pivot 92 and will have no effect in pivoting the retaining member 90. Thus, in order for the operator to reengage the drive and release the brake to the cutting blade, it is necessary to first raise his feet from the foot bar 100. Thus a two-step operation is required which will minimize or at least reduce inadvertent activation of the blade. Also, in the preferred embodiment shown, the rear end 98 of the retaining member 90 is bent downwardly and made of a sufficient width so that it will extend across slot 80 and act as a stop to prevent movement of control rod 70 along slot 80 from a position at the rear end of slot 80 when the foot bar 100 is depressed thereby preventing actuating of the cutting blade.

It will also be seen that while the operator must maintain the foot bar 100 depressed in order to continue activation of the cutting blade, he may easily do this with one foot and still perform the other functions with the other conventional clutch and brake foot pedals 5 and 6 since they are located in the same area. In addition, the operator may control the lawn mower easily and without impaired movement while the foot pedal is raised.

It will also be noted that during a cutting operation when the blade is rotating, should the operator raise one of his feet off the foot bar, the foot bar will still be depressed by the other foot and that is necessary to lift both feet off the foot bar in order to automatically deactivate the blade.

What is claimed is:

1. A power-driven riding lawn mower including a rotatable cutting blade, first means for controlling operation of the cutting blade, second means for controlling the first means including a control member movable between a first position for operating the cutting blade and a second position for stopping the cutting blade, biasing means urging said control member to said second position thereof, retaining means for releasably holding said control member when in said first position, a foot member engageable by the operator's feet and connected to said retaining means and being movable between a depressed position for holding the control member in said first position thereof and a raised position for permitting the control member to move to said second position thereof, and means biasing the foot member to its raised position, a support having a passage therein receiving said control member and wherein said retaining means is mounted to said support for movement between a first position for holding said control member in said first position thereof and a second position for releasing the control member and permitting it to move to said second position.

2. The combination defined in claim 1 further including control pedals at the front of the mower and wherein said foot member is located adjacent to but rearwardly of said control pedals.

3. The combination defined in claim 2 further including a blade housing containing the cutting blade, suspension arms fixed to the blade housing for suspending the blade housing, and wherein said foot member is mounted to said suspension arms.

4. The mower defined in claim 1 wherein said retaining means includes a retaining member pivotally mounted to said support to close a portion of said passage for holding the control member in said first position thereof, said retaining member being movable away from said passage for releasing the control member and permitting it to move to said second position thereof in response to movement of said foot member to the raised position thereof.

5. The mower defined in claim 1 wherein said first means includes a rotatable drive shaft for rotating said cutting blade, a pulley fixed to said drive shaft, a pulley belt mounted on said pulley for driving said pulley, an idler pulley, a mount arm supporting said idler pulley for movement between a first position wherein the idler pulley engages said pulley belt and applies tension to the pulley belt for establishing a drive to the cutting blade and a second position releasing tension on the pulley belt for disengaging the drive to the cutting blade, and means operatively interconnecting said mount arm and said control member for operating said control member and, in turn, said idler pulley in response to movement of the control member.

6. The mower defined in claim 5 wherein said first means further includes a brake member mounted to the mount arm for braking and releasing said drive shaft in response to movement of said mount arm.

7. The mower defined in claim 4 wherein said passage has an elongated portion and has an enlarged portion at one end thereof receiving said control member when the control member is in said first position thereof.

8. The mower defined in claim 7 wherein said retaining member has a recessed inner edge portion engageable with the central member to maintain the control member in said first position thereof.

9. The mower defined in claim 8 wherein said retaining member has a second inner edge portion generally aligned with the pivot axis of the retaining member for preventing the control member from moving into said first position thereof when the retaining member is in said first position thereof closing a portion of said passage.

10. The mower defined in claim 1 wherein said retaining means prevents the control member from moving from said second position to said first position as long as said foot member is in said raised position thereof.

11. The mower defined in claim 7 further including a roller mounted to said support at the juncture between said enlarged and elongated portions of said passage for engaging the control member.

* * * * *